United States Patent
Mohajerani et al.

(10) Patent No.: US 6,255,750 B1
(45) Date of Patent: Jul. 3, 2001

(54) APPARATUS AND METHOD FOR REDUCING DISC FLUTTER AND DISC VIBRATION EFFECTS IN A DISC DRIVE

(75) Inventors: Khosrow Mohajerani, Boulder; Wallis A. Dague, Louisville, both of CO (US)

(73) Assignee: Seagate Technology LLC, Scotts Valley, CA (US)

( * ) Notice: Subject to any disclaimer, the term of this patent is extended or adjusted under 35 U.S.C. 154(b) by 0 days.

(21) Appl. No.: 09/475,015

(22) Filed: Dec. 30, 1999

Related U.S. Application Data (60) Provisional application No. 60/130,273, filed on Apr. 21, 1999.

(51) Int. Cl.[7] .................................................. H02K 5/24
(52) U.S. Cl. ...................... 310/51; 310/67 R; 360/97.01; 360/98.08
(58) Field of Search .................................. 310/51, 67 R, 310/97.01, 98.08, 98.04, 99.12

(56) References Cited

U.S. PATENT DOCUMENTS

| | | | |
|---|---|---|---|
| 4,945,432 | * 7/1990 | Matsudaira et al. | 360/98.02 |
| 5,272,581 | 12/1993 | Kojima et al. | 360/98.01 |
| 5,367,418 | 11/1994 | Chessman et al. | 360/99.12 |
| 5,422,768 | 6/1995 | Roehling et al. | 360/98.08 |
| 5,436,775 | 7/1995 | Ishimatsu | 360/98.08 |
| 5,459,627 | 10/1995 | Peter | 360/98.08 |
| 5,636,084 | 6/1997 | Ishizuka | 360/99.08 |
| 5,663,851 | 9/1997 | Jeong et al. | 360/98.08 |
| 5,781,374 | 7/1998 | Moir et al. | 360/99.12 |
| 5,847,900 | 12/1998 | Iwabuchi | 360/98.08 |

* cited by examiner

Primary Examiner—Nestor Ramirez
Assistant Examiner—Thanh Lam
(74) Attorney, Agent, or Firm—Merchant & Gould, P.C.; Paul Prendergast (57) ABSTRACT

An apparatus and method for reducing the effects of disc flutter or noise in a disc drive incorporates damping material or rings that are clamped or sandwiched against mounted information storage disc at a distance from a hub portion of a spindle assembly. The damping rings are positioned between a disc clamp and a bottom annular flange of the hub portion so as to engage and reduce vibrations in the mounted information storage disc or discs. The damping rings can be retained in grooves defined in the disc clamp, bottom annular flange and top and bottom surfaces of an annular disc spacer. Alternatively, the damping rings can be reatined on tubular sidewalls defined on the disc clamp, bottom annular flange of the hub portion and annular disc spacer. The arrangement of damping rings absorbs energy transmitted by vibrations in information storage disc and thus minimizes the effects of disc flutter in a disc drive.

20 Claims, 4 Drawing Sheets

APPARATUS AND METHOD FOR REDUCING DISC FLUTTER AND DISC VIBRATION EFFECTS IN A DISC DRIVE

RELATED APPLICATIONS

This application claims the benefit of priority of United States Provisional Patent Application Serial No. 60/130,273 entitled "Disc Flutter And Vibration Improvements," filed Apr. 21, 1999.

FIELD OF THE INVENTION

This application relates to magnetic disc drives and more particularly to an improved hard disc drive motor spindle assembly that minimizes the effects of disc flutter.

BACKGROUND OF THE INVENTION

Disc drives are data storage devices that store digital data in magnetic form on a rotating storage medium on a disc. Modern disc drives comprise one or more rigid discs that are coated with a magnetizable medium and mounted on the hub of a spindle motor for rotation at a constant high speed. Information is stored on the discs in a plurality of concentric circular tracks typically by an array of transducers ("heads") mounted to a radial actuator for movement of the heads relative to the discs. Each of the concentric tracks is generally divided into a plurality of separately addressable data sectors. The read/write transducer, e.g. a magneto resistive read/write head, is used to transfer data between a desired track and an external environment. During a write operation, data is written onto the disc track and during a read operation the head senses the data previously written on the disc track and transfers the information to the external environment. Critical to both of these operations is the accurate locating of the head over the center of the desired track.

The heads are mounted via flexures at the ends of a plurality of actuator arms that project radially outward from the actuator body. The actuator body pivots about a shaft mounted to the disc drive housing at a position closely adjacent the outer extreme of the discs. The pivot shaft is parallel with the axis of rotation of the spindle motor and the discs, so that the heads move in a plane parallel with the surfaces of the discs.

Typically, such radial actuators employ a voice coil motor (VCM) to position the heads with respect to the disc surfaces. The actuator VCM includes a coil mounted on the end of the actuator body opposite the head arms so as to be immersed in the magnetic field of a magnetic circuit comprising one or more permanent magnets and magnetically permeable pole pieces. When controlled direct current (DC) is passed through the coil, an electromagnetic field is set up which interacts with the magnetic field of the magnetic circuit to cause the coil to move in accordance with the well-known Lorentz relationship. As the coil moves, the actuator body pivots about the pivot shaft and the heads move across the disc surfaces. The actuator thus allows the heads to move back and forth in an arcuate fashion between an inner radius and an outer radius of the discs.

The actuator arms are driven by a control signal fed to the VCM at the rear end of the actuator body. A servo system is used to sense the position of the actuator and control the movement of the head above the disc using servo signals read from a disc surface. The servo system thus relies on servo information stored on each disc. The signals from this information generally indicate the present position of the head with respect to the disc, i.e., the current track position. The servo system uses the sensed information to maintain head position or determine how to optimally move the head to a new position centered above a desired track. The servo system then delivers a control signal to the VCM to rotate the actuator to position the head over a desired new track or maintain the position over the desired current track.

Another parameter for accessing a desired track is the speed at which the disc rotates about the spindle axis. Disc rotation speed contributes to the time it takes the actuator arm to access a desired track, where a higher disc rotation speed allows for faster access times to the track and a slower disc rotation speed results in slower access time to the track. It is highly desirable in the disc drive art to have high disc rotation speeds and thus faster access times to the desired track.

An important aspect for accessing a desired track is the ability of the actuator arm, and hence the magneto resistive head, to maintain its proper positioning. For optimal performance, a head must maintain a centered position within the desired track. If the head becomes off-center within a track, even by a micro-inch, a tangible effect is noticed in the performance of the drive, i.e., lower overall reliability of the head to properly read or write-to a disc.

Critical to maintaining proper head positioning within a track is minimizing the effects of a phenomena called "disc flutter." Disc flutter or noise is generated by vibrations associated with the normal use of the disc drive system, where several contributing factors include: the rotation of the spindle, air turbulence around the periphery of the rotating disc or discs, the information storage disc thickness, the disc natural modes of frequency and frequencies and the clamping force exerted on the information storage disc. The combination of these factors can produce tangential waves that are at a maximum at the outer diameter or periphery of the information storage disc and at a minimum at the inner diameter of the disc. Additionally, as mentioned above, it is desirable to have higher disc rotation speeds for faster track access and thus faster spindle rotation. As such, the causes of disc flutter are increased as the rotation speed of the spindle increases. It is thus apparent that the effects of disc flutter are and will continue to be a major concern for the disc drive art.

Currently, a number of solutions have been implemented to minimize disc flutter, including: (1) incorporating air shrouds around the disc periphery to minimize air turbulence; (2) utilizing a more rigid spindle assembly to increase vibrational stability; and (3) utilizing higher modulus disc substrates and/or modulating the disc thickness to minimize the amplitude of any created noise. Although these solutions have had some benefit in reducing the effects of disc flutter, there is a need in the art to provide a more effective solution for minimizing and potentially eliminating the problem.

SUMMARY OF THE INVENTION

The present invention is a disc drive having a disc drive motor spindle assembly that includes damping material or rings positioned within the assembly to dampen the vibrations caused by the effects of disc flutter.

In accordance with one embodiment of the present invention, a disc drive motor spindle assembly includes a cylindrical hub portion that defines an outer surface and a bottom annular flange. An annular information storage disc defining a top and bottom surface is mounted on the cylindrical hub portion and is clamped between a disc clamp and the bottom annular flange of the hub portion. A damping ring contacts a surface of the annular information storage disc between the disc clamp and the bottom annular flange at a distance from the outer surface of the cylindrical hub portion of the spindle. The damping ring reduces vibrations caused by disc flutter by absorbing the energy of the vibrations.

The present invention can also be implemented as a disc drive motor spindle assembly having a second damping ring, where one damping ring contacts the top surface of the annular information storage disc and the other damping ring contacts the bottom surface of the annular information storage disc. The damping rings are clamped between the disc clamp and the bottom annular flange. In an alternative embodiment, the two damping rings are positioned at the same predetermined distance from the outer surface of the cylindrical hub portion.

The present invention can further be implemented as a method for reducing the effects of disc flutter in a disc drive. The method is comprised of the steps of assembling an annular information storage disc on the hub portion of the disc drive spindle, engaging the information storage disc with a damping ring at a distance from the hub portion and securing a disc clamp to the hub portion of the disc drive spindle for exerting a clamping force through the damping ring to the annular information storage disc.

These and various other features as well as advantages which characterize the present invention will be apparent from a reading of the following detailed description and a review of the associated drawings.

DETAILED DESCRIPTION

Figure 1:
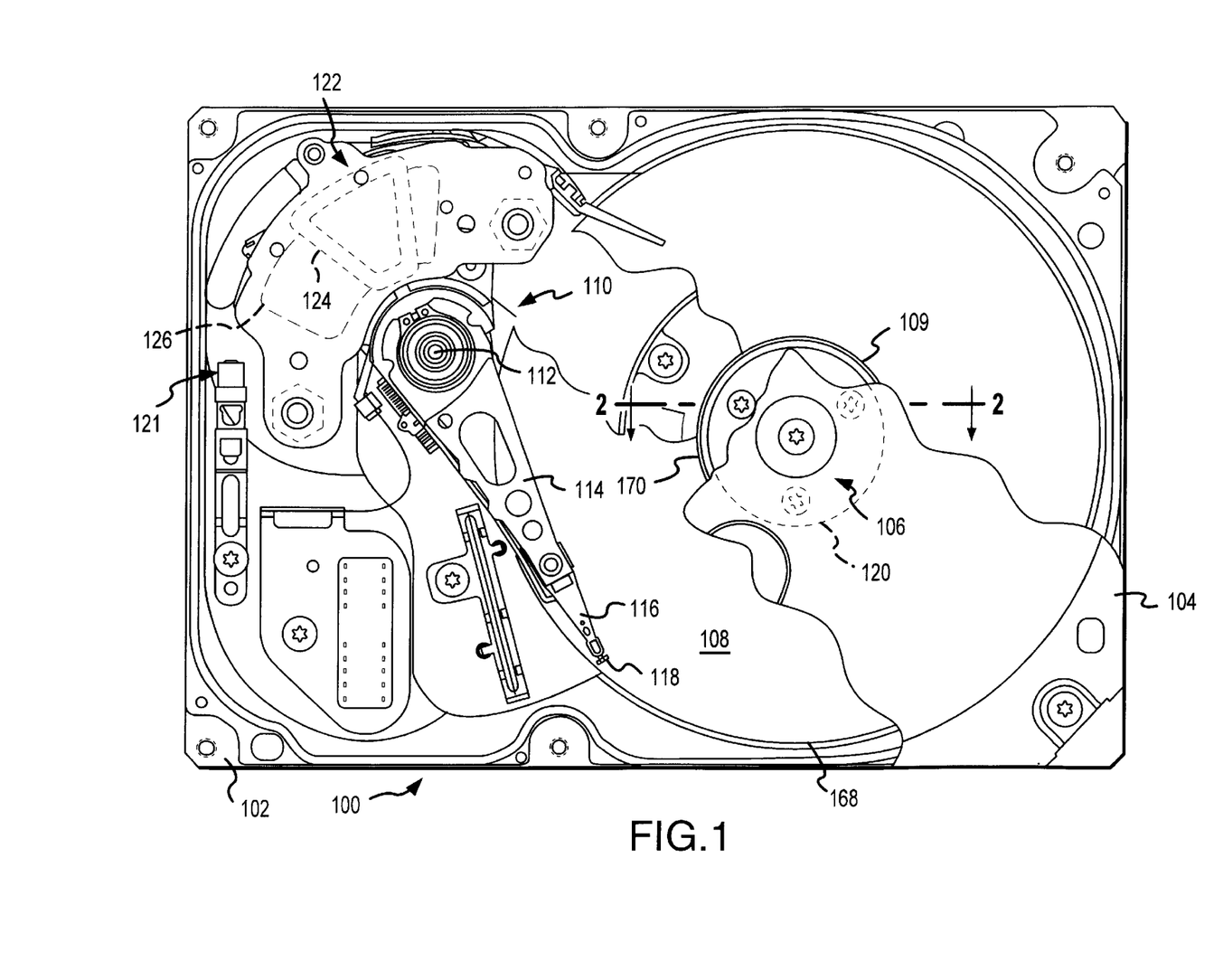
FIG. 1 is a plan view of a disc drive in accordance with a preferred embodiment of the invention.

A disc drive 100 constructed in accordance with a preferred embodiment of the present invention is shown in FIG. 1. The disc drive 100 includes a base plate 102 to which various components of the disc drive 100 are mounted. A top cover 104, shown partially cut away, cooperates with the base 102 to form an internal, sealed environment for the disc drive in a conventional manner. The components include a disc drive motor spindle assembly 106 which includes a spindle motor (not shown) for rotating one or more information storage discs 108 at a constant high speed. Information is written to and read from tracks on the discs 108 through the use of an actuator assembly 110, which rotates about a bearing shaft assembly 112 positioned adjacent the discs 108. The actuator assembly 110 includes a plurality of actuator arms 114 which extend towards the discs 108, with one or more flexures 116 extending from each of the actuator arms 114. Mounted at the distal end of each of the flexures 116 is a head 118 which includes an air bearing slider enabling the head 118 to fly in close proximity above the corresponding surface of the associated disc 108.

The spindle motor (not shown) is typically de-energized when the disc drive 100 is not in use for extended periods of time. The heads 118 are moved over park zones 120 near the inner diameter of the discs 108 when the drive motor is de-energized. The heads 118 are secured over the park zones 120 through the use of an actuator latch arrangement 121, which prevents inadvertent rotation of the actuator assembly 110 when the heads are parked.

The radial position of the heads 118 is controlled through the use of a voice coil motor (VCM) 122, which typically includes a coil 124 attached to the actuator assembly 110, as well as one or more permanent magnets 126 that establish a magnetic field in which the coil 124 is immersed. The controlled application of current to the coil 124 causes magnetic interaction between the permanent magnets 126 and the coil 124 so that the coil 124 moves in accordance with the well known Lorentz relationship. As the coil 124 moves, the actuator assembly 110 pivots about the bearing shaft assembly 112 and the heads 118 are caused to move across the surfaces of the discs 108. The discs 108 are rotated at a constant high speed by a spindle control circuit, which typically electrically commutates the spindle motor through the use of back electromotive force (BEMF) sensing. The radial position of the heads 118 is controlled through the application of current to the coil 124 of the actuator assembly 110.

Figure 2:
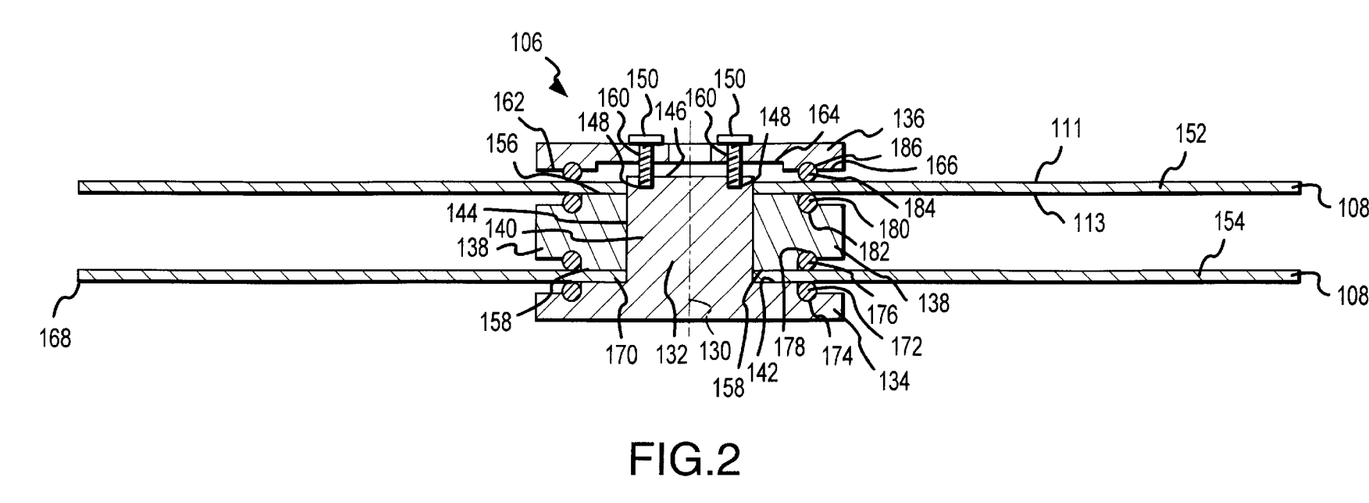
FIG. 2 is a sectional view taken along line 2—2 in FIG. 1 showing a damping material engaging an information storage disc in accordance with a first preferred embodiment of the invention.

Referring now to FIG. 2, shown therein is a sectional view taken along line 2—2 of FIG. 1 of the disc drive motor spindle assembly 106 of the present invention. The disc drive motor spindle assembly 106 is coupled to the base plate 102 (FIG. 1) of the disc drive 100. The assembly 106 projects in an upward vertical direction from the base plate 102 and includes a non-rotating spindle shaft (not shown) along axis 130, a cylindrical shaped hub portion 132 having a bottom radial flange 134, a disc clamp 136, one or more information storage discs 108 mounted on the hub portion 132 of the spindle assembly, and a disc spacer or collar 138.

In more detail, the spindle shaft (not shown) is operatively fastened to the base plate 102 of the disc drive 100 and defines the axis of rotation 130 for the spindle assembly. The rotatable cylindrical hub portion 132 of the spindle assembly is journaled to the spindle shaft (not shown) and further includes a cylindrical tubular portion 140 extending upward from the bottom radial flange 134. The flange 134 is generally plate shaped having a disc loading surface 142 that extends in a generally perpendicular direction away from the cylindrical tubular portion 140 of the hub. The cylindrical tubular portion 140 of the hub 132 is generally an elongated tube having an outer surface or sidewall 144 and a top surface 146. The tubular sidewall 144 of the hub 132 acts as a stacking surface for mounting information storage discs 108 where each disc defines a central aperture 109 (FIG. 1), a top surface 111 and a bottom surface 113. The top surface 146 of the hub 132 acts as a platform for receiving the disc clamp 136 and defines axially directed threaded bores 148 for receiving retaining nuts or screws 150 used to help attach the disc clamp 136 to the spindle hub portion 132.

FIG. 2 illustrates a top and bottom information storage disc 152 and 154 respectively mounted on the tubular sidewall 144 of the spindle hub 132 and a disc spacer or collar 138 positioned between the two discs 152 and 154 respectively. The disc spacer 138 has an annular top and bottom surface 156 and 158 respectively for engagement with the top and bottom information storage discs 152 and 154 respectively.

The disc clamp 136 engages the top surface 146 of the hub portion 132 to retain information storage discs 152 and 154 on the spindle assembly. The clamp 136 is generally a flat disc that defines threaded bores 160 aligned with the threaded bores 148 positioned in the top surface of the hub. In the preferred embodiment shown in FIG. 2, three pairs of bores 148 and 160 are spaced about the axis 130. A bottom surface 162 of the disc clamp 136 faces the top surface 146 of the hub 132 and defines two engagement surfaces: a flat surface 164 positioned at the inner diameter of the disc clamp for making metal to metal contact with the top surface 146 of the hub 132, and a peripheral surface 166 that protrudes lower than the inner diameter flat surface 164 forming a ridge around the periphery of the bottom surface 162.

The spindle assembly 106 contains an electric spindle motor (not shown) adapted to rotate the spindle hub 132. Alternatively, it is envisioned that the spindle motor could be located proximately to the spindle assembly on the base plate 102 of the device.

Preferably, the hub portion 132 of the spindle assembly 106, the disc clamp 136 and the disc spacer 138 are all made from stainless steel or aluminum. It is envisioned, however, that any suitable material can be used in the construction of the spindle assembly parts as long as each part performs and attains the ends and advantages required of a disc drive motor spindle assembly.

As previously noted in the background section, normal disc operating conditions result in a condition called "disc flutter" or noise. Essentially, disc flutter includes vibrations that resonate throughout the information storage disc 108, with maximum vibrations at an outer diameter 168 of the disc and minimum vibrations at an inner diameter 170 of the disc. The present invention (shown in several preferred embodiments FIGS. 2–5) entails an improved disc drive motor spindle assembly that allows for the damping or de-coupling of the these vibrations through the positioning of damping material or rings contacting the information storage disc at a position away from the tubular sidewall 144 of the spindle hub 132. As discussed in greater detail below, the damping rings are positioned to absorb the vibrational energy generated by "disc flutter" and thus provide a more reliable environment for the magneto resistive head to operate.

In the embodiment of the present invention shown in FIG. 2, a damping material or ring 172 is received by a peripheral recess or groove 174 defined in the loading surface 142 of the radial flange 134. The damping ring 172 is maintained in the groove 174 and extends upwardly in an axial direction beyond the loading surface 142 of the flange 134. Similarly, a damping ring 176 is received by a peripheral recess or groove 178 defined in the bottom surface 158 of the disc spacer 138, while a damping ring 180 is received by a peripheral recess or groove 182 defined in the top surface 156 of the disc spacer 138. Each damping ring 176 and 180 extends in an axial direction beyond the surface of the spacer, 158 and 156 respectively. Finally, a damping ring 184 is received by a circular recess or groove 186 defined in the peripheral bottom surface 166 of the disc clamp 136. The damping ring 184 extends in an axial downward direction beyond the bottom surface 162 of the disc clamp 136.

Screws or bolts 150 are received in threaded bores 160 defined in the disc clamp 136 and in threaded bores 148 defined in the top surface 146 of the hub portion 132. Each bolt's threads engage the threaded interface of the pair of two bores 148 and 160 to secure the disc clamp 136 to the spindle hub 132 and force the disc clamp to exert downward pressure in an axial direction through the spindle assembly 106, with a corresponding reaction force being exerted by the flange loading surface 142 in response to the exerted downward pressure. This clamping pressure results in the top information storage disc 152 being compressed between the damping rings 184 and 180 and the bottom information storage disc 154 being compressed between the damping rings 176 and 172. It is understood that the use of damping rings to compress the mounted information storage discs will not alter the relationship between the metal to metal contacts normally made between the clamp 136, hub 132, spacer 138 and information storage discs 108. As such, the present invention will not alter the precise stack height requirements for the spindle assembly and consequently will not effect the tolerance buildups found in the spindle assembly.

In general, damping rings 172, 176, 180 and 184 are preferably positioned the same predetermined radial distance from the spindle assembly axis of rotation so that the rings are axially aligned. Mis-aligned damping rings are less effective at damping the effects of disc flutter, and also have the additional adverse effect of introducing off center distortions into the rotating disc. However, while the preferred embodiment of the invention envisions a damping ring sandwiching the top and bottom surfaces, 111 and 113 respectively, of an information storage disc 108 it should also be understood that a single damping ring can be used to partially absorb the vibrations that result from disc flutter. For that matter, it should be understood that multiple damping rings sandwiched on the same side of an information storage disc can also be used to absorb the vibrations that result from disc flutter. Further, it should be understood that the use of two information storage discs 152 and 154 in FIG. 2 is purely for illustrative purposes and the invention could be used with one disc 108 and no spacer 138 or with additional discs and additional spacers.

The damping rings are preferably made from an elastomer, but may be composed of a non-elastomer, as long as the material is effective at damping vibrations of the disc and is durable for the life of the disc drive. Several suitable materials may include, but are not limited to: nylon, rubber, or plastic. Additionally, although the preferred damping material is described as a continuous ring around a component of the disc drive motor spindle assembly, discontinuous damping material structures are also envisioned within the scope of the present invention.

Figure 3:
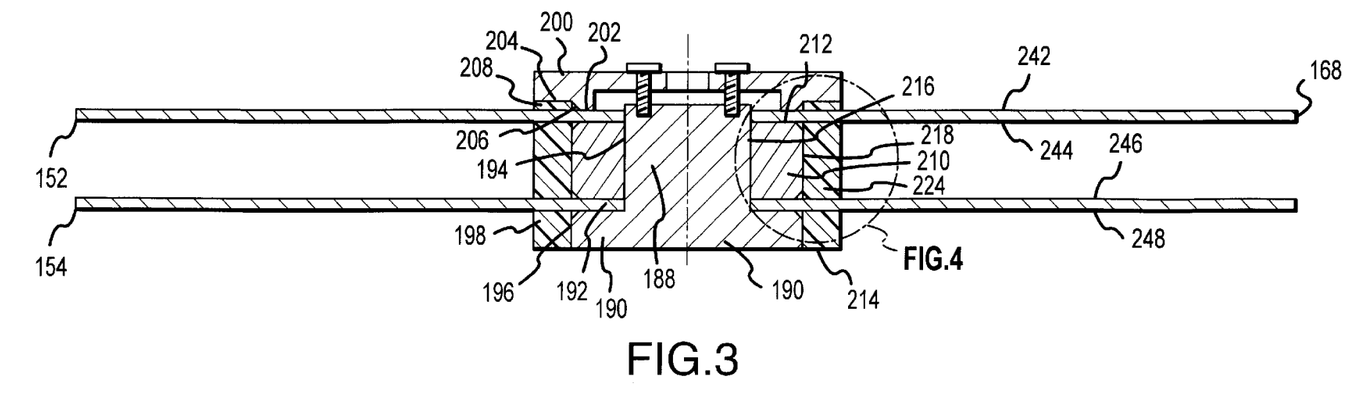
FIG. 3 is a representative sectional view through a disc drive motor spindle assembly similar to FIG. 2 showing a damping material engaging an information storage disc in accordance with a second preferred embodiment of the invention.

A second preferred embodiment of the present invention is shown in FIG. 3. This embodiment discloses damping rings that are overmolded in place. A rotatable cylindrical spindle hub 188 defines a bottom radial flange 190 adjacent to the base plate 102. The flange 190 is generally plate shaped having a loading surface 192 that extends beyond an outer surface 194 of the hub 188 and further defines a tubular shaped sidewall 196. A damping ring 198 is overmolded to the sidewall 196 of the flange 190 and extends upwardly in an axial direction above the loading surface 192 of the flange to contact the bottom information storage disc 154. It is envisioned that the tubular shaped sidewall 196 may define a chamfered edge 197 (FIG. 4) for providing space for the compressed and deformed damping ring.

The disc clamp 200 is substantially the same as the clamp 136 disclosed in the previous embodiment, however, a downward protruding peripheral surface 202 defines a recess or notch 204 having a sidewall 206 for receiving an overmolded damping ring 208. The damping ring 208 is overmolded to the notch sidewall 206 and extends downwardly in an axial direction slightly below the bottom peripheral surface 202 of the disc clamp 200. As with the bottom annular flange, it is envisioned that the tubular shaped sidewall 206 of the disc clamp could define a chamfered edge 207 (FIG. 4) for providing space for the compressed and deformed damping ring.

Figure 4:
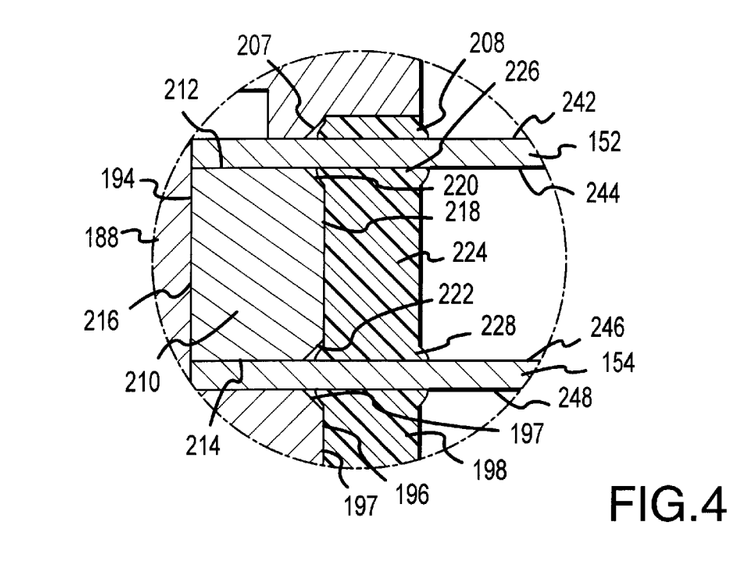
FIG. 4 is an enlarged sectional view of the disc drive motor spindle assembly of FIG. 3 illustrating details of the spindle hub, disc spacer and disc clamp.

A disc spacer or collar 210 has an annular top and bottom surface 212 and 214 respectively, a central aperture 216 that allows the spacer 210 to be mounted on the hub portion 188 of the spindle assembly, and a tubular shaped sidewall 218 having chamfered top and bottom edges 220 and 222 respectively (FIG. 4). The top and bottom surfaces 212 and 214 of the spacer 210 are flat and act as engagement surfaces for interacting with the top and bottom information storage discs 152 and 154 respectively, via metal to metal contact. A damping ring 224 having top and bottom edges 226 and 228 respectively is overmolded to the sidewall 218 of the spacer such that the top edge 226 of the damping ring 224 extends upwardly in an axial direction slightly above the top surface 212 of the spacer 210 and the bottom edge 228 of the damping ring 224 extends downwardly in an axial direction slightly below the bottom surface 214 of the spacer 210. Once compressed, the damping ring 224 is deformed to take position within the confines defined by the chamfered edges 220 and 222, as shown in FIG. 4.

Figure 5:
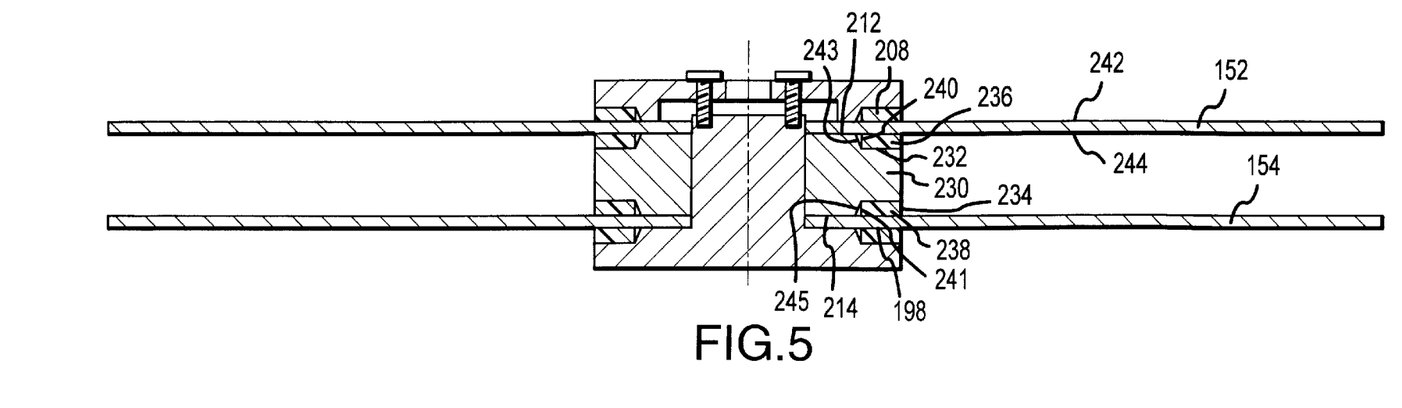
FIG. 5 is a representative sectional view through a disc drive motor spindle assembly similar to FIG. 2 showing a damping material engaging an information storage disc in accordance with a third preferred embodiment of the invention.

FIG. 5 illustrates a third preferred embodiment of the present invention where the disc spacer 230 alternatively defines a top recess or notch 232 positioned in the top surface 212 of the spacer 230 and a bottom recess or notch 234 positioned in the bottom surface 214 of the spacer 230, each notch receiving overmolded damping rings, 236 and 238 respectively. Damping ring 236 is overmolded to a top surface notch sidewall 240 of the spacer top notch 232 such that the damping ring 236 extends upwardly in an axial direction slightly above the top surface 212 of the spacer 230, while damping ring 238 is overmolded to a bottom surface 214 notch sidewall 241 of the spacer notch 234 such that the damping ring 238 extends downwardly in an axial direction slightly below the bottom surface 214 of the spacer. It is envisioned that the sidewall of the top and bottom recesses or notches can define chamfered edges (243 and 245 respectively) for the same purpose as described above.

Damping rings 198, 208 and 224 shown in FIG. 3 and rings 198, 208, 236 and 238 shown in FIG. 5 should be understood to function in the same manner as damping rings 172, 176, 180 and 184 described in FIG. 2. Briefly, with regard to FIG. 3, clamping pressure between the disc clamp 200 and the flange loading surface 192 results in the top information storage disc 152 being compressed between damping ring 208 and the top edge 226 of damping ring 224, where damping ring 208 contacts the top surface 242 of the disc 152 and the top edge 226 of damping ring 224 contacting the bottom surface 244 of disc 152. The bottom information disc 154 is compressed between the bottom edge 228 of damping ring 224 and damping ring 198, where the bottom edge 228 of damping ring 224 contacts the top surface 246 of the disc 154 and damping ring 198 contacting the bottom surface 248 of disc 154. FIG. 5 shows the top information storage disc 152 compressed between damping ring 208 and 236 and the bottom information disc compressed between damping rings 238 and 198.

Figure 6:
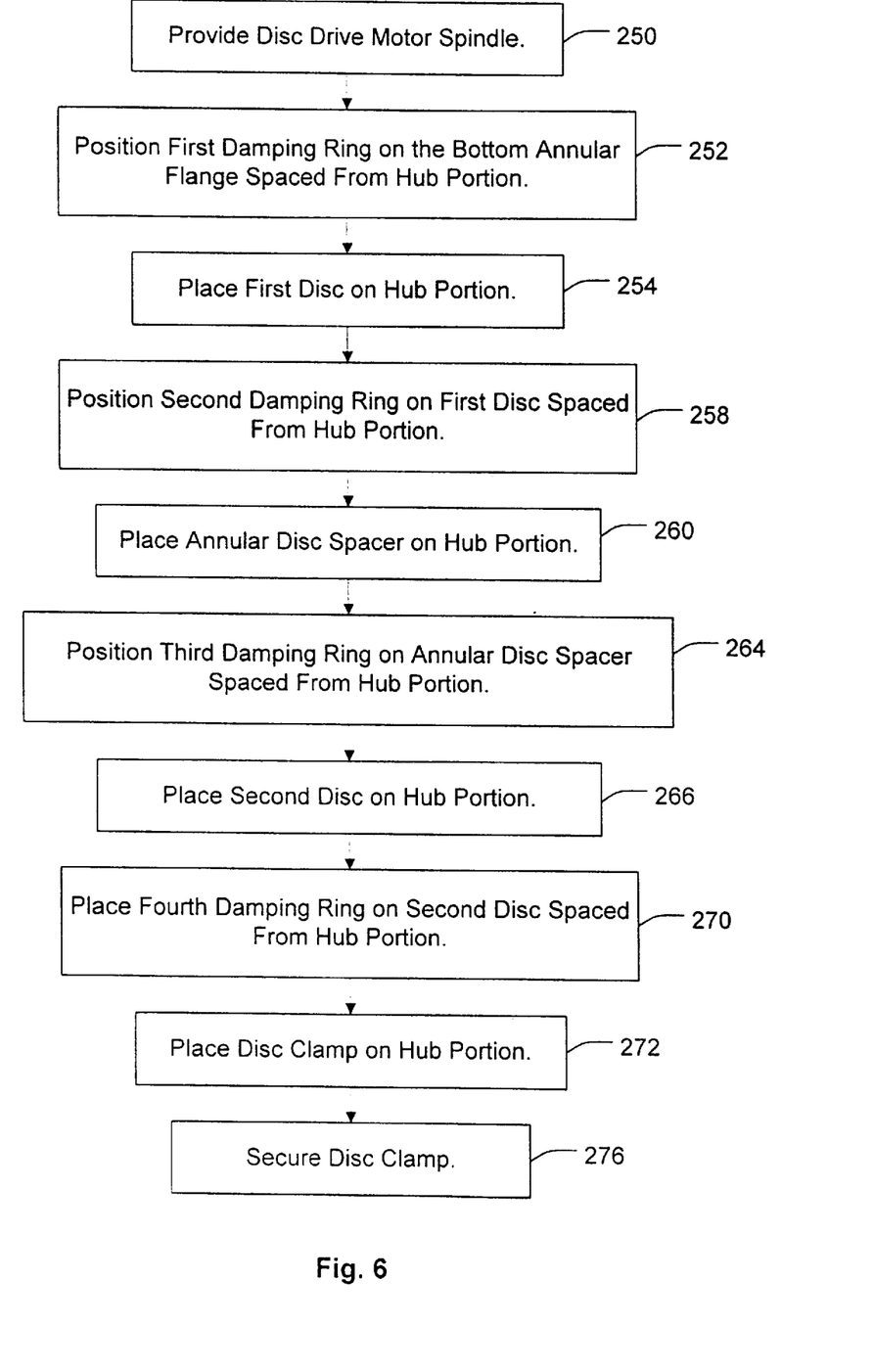
FIG. 6 is a flow chart of the method of assembling a disc drive motor spindle assembly in accordance with a preferred embodiment of the present invention.

A method for reducing the effects of disc flutter in a disc drive motor spindle assembly is shown in FIG. 6. FIG. 6 is for illustrative purposes and shows a disc drive motor spindle assembly having two information storage disc and four damping rings. It should be understood that the present inventive method encompasses the mounting of one or more information storage disc and one or more damping rings.

In operation 250, the user obtains a disc drive motor spindle assembly having a cylindrical hub portion where the cylindrical hub portion further defines a bottom annular flange. In operation 252, a first damping ring is positioned on the bottom annular flange at a space away from the cylindrical hub portion. A first information storage disc is then mounted on the bottom annular flange in operation 254. In operation 258, a second damping ring is positioned on the first information storage disc at a space away from the hub portion. In operation 260 an annular disc spacer is mounted on the hub portion. In operation 264, a third damping ring is then positioned on the annular disc spacer at a position away from the hub portion. In operations 266, a second information storage disc is mounted on the annular disc spacer. In operations 270 and 272, a fourth damping ring is positioned on the second information storage disc at a space from the hub portion, followed by the disc clamp being placed on top of the fourth damping ring and second information storage disc. Finally, in operations 276, the disc clamp is secured to the disc drive motor spindle hub portion. In the alternative, the second damping ring could be positioned on the annular disc spacer and the third damping ring could be positioned on the second information storage disc.

In summary, the present invention is a disc drive having a disc drive motor spindle assembly (such as 106) for reducing the effects of disc flutter in the disc drive (such as 100). The disc drive motor spindle assembly (such as 106) includes a cylindrical hub portion (such as 132) that defines an outer surface (such as 144) and a bottom annular flange (such as 134). An annular information storage disc (such as 108) that has a central aperture (such as 109), a top surface (such as 111) and a bottom surface (such as 113), is mounted on the cylindrical hub portion. A disc clamp (such as 136) is secured to the cylindrical hub portion (such as 132), and extends radially outward beyond the outer surface of the hub portion to contact a portion of the mounted annular information storage disc (such as 108) and clamps the information storage disc (such as 108) between the disc clamp (such as 136) and the bottom annular flange (such as 134). A damping ring (such as 184) contacts the annular information storage disc (such as 108) and either the disc clamp (such as 136) or the bottom annular flange (such as 134) for absorbing vibrational energy from the information storage disc. The damping ring may be an elastomer.

A second damping ring (such as 172) may be added which contacts the information storage disc (such as 108) between the disc clamp (such as 136) and the bottom annular flange (such as 134). The two damping rings (such as 172 and 184) are positioned so that one ring contacts the top surface (such as 111) of the disc and the other ring contacts the bottom surface (such as 113) of the disc. The two damping rings contact the disc at predetermined distances from the outer surface of the hub portion, the predetermined distance may be the same for the damping rings.

The disc clamp (such as 136) and bottom annular flange (such as 134) may each have a peripheral groove (such as 186 and 174 respectively) for supporting one of the two damping rings (such as 184 and 172). Alternatively, the disc clamp (such as 200) and bottom annular flange (such as 190) may have tubular sidewalls (such as 206 and 196) to support one of the two overmolded damping rings (such as 208 and 198). Chamfered edges (such as 207 and 197) may be defined by the disc clamp or bottom annular flange sidewalls.

The disc drive motor spindle assembly may further include a second information storage disc (such as 154) and an annular disc spacer (such as 210). The annular disc spacer has a top surface (such as 212), a bottom surface (such as 214) and a tubular sidewall (such as 218) and is attached to the hub portion between the fist information storage disc (such as 152) and a second information storage disc (such as 154).

When more than one disc is mounted on the disc drive motor spindle assembly, a first (such as 208), second (such as 224) and third (such as 198) damping rings may be included in the apparatus. The first damping ring (such as 208) contacts the top surface (such as 242) of the first disc (such as 152) at a first predetermined distance from the outer surface (such as 194) of the cylindrical hub portion (such as 188). The second damping ring (such as 224) is overmolded to the tubular sidewall (such as 218) of the annular disc spacer (such as 210) and contacts the bottom surface (such as 244) of the first disc (such as 152) and the top surface (such as 246) of the second disc (such as 154) at a second predetermined distance from the outer surface (such as 194) of the cylindrical hub portion (such as 188). The third damping ring contacts the bottom surface (such as 248) of the second disc (such as 154) at a third predetermined distance from the outer surface of the cylindrical hub portion. The first, second and third predetermined distances may be the same.

A first (such as 208), second (such as 236), third (such as 238) and fourth (such as 198) damping rings may also contact the first (such as 152) and second (such as 154) information storage disc between the disc clamp (such as 200) and the bottom annular flange (such as 190). The first damping ring (such as 208) and second damping ring (such as 236) contact the first disc (such as 152) between the disc clamp (such as 200) and the top surface (such as 212) of the annular disc spacer (such as 210). The third (such as 238) and fourth (such as 198) damping rings contact the second disc (such as 154) between the bottom surface (such as 214) of the annular disc spacer (such as 210) and the bottom annular flange (such as 190). Further, the first damping ring (such as 208) may contact the top surface (such as 242) of the first disc (such as 152) at a first predetermined distance from the outer surface (such as 194) of the cylindrical hub portion (such as 188). The second damping ring (such as 236) may contact the bottom surface (such as 244) of the first disc at a second predetermined distance from the outer surface of the cylindrical hub portion. The third damping ring (such as 238) may contact the top surface (such as 246) of the second disc (such as 154) at a third predetermined distance from the outer surface of the cylindrical hub portion, and the fourth damping ring (such as 198) may contact the bottom surface (such as 248) of the second disc at a fourth predetermined distance from the outer surface of the cylindrical hub portion. The first, second, third and fourth predetermined distances may be the same.

The top and bottom surface's (such as 156 and 158 respectively) of the annular disc spacer (such as 138) may also define a peripheral groove for supporting a damping ring (such as 180 and 176 respectively). Alternatively, the annular disc spacer (such as 210) may have a top and bottom notch or recess (such as 232 and 234 respectively) where each recess defines a sidewall (such as 240 and 241 respectively). The sidewall edges of the disc spacer may define chamfered edges (243 and 245 respectively).

The present invention is also a method for reducing the effects of disc flutter in a disc drive, where a disc drive motor spindle having a cylindrical hub portion is provided to the user (such as step 250). An annular disc is placed on the hub portion of the disc drive spindle and engaged by a damping ring at a distance from the hub portion (such as steps 256 and 258). And a disc clamp is secured to the hub portion and exerts a clamping force to the annular disc (such as step 276).

The method of reducing the effects of disc flutter in a disc drive may further include positioning the damping ring between the annular disc and either a bottom annular flange or the disc clamp (such as steps 252 or 274). The method may further include positioning a annular disc spacer on the first annular disc and assembling a second annular disc on the spindle hub portion such that the spacer is between the first annular disc and the second annular disc (such as steps 260 and 266). Engaging the second annular disc is a second damping ring at a distance from the hub portion (such as step 264).

It will be clear that the present invention is well adapted to attain the ends and advantages mentioned as well as those inherent therein. While a presently preferred embodiment has been described for purposes of this disclosure, numerous changes may be made which will readily suggest themselves to those skilled in the art For example, while the preferred embodiment of the invention discloses a series of damping rings compressing the information storage discs, it is understood that other discontinuous damping rings or material could also be used to dampen the disc and would be within the scope of the disclosure. Thus, it is envisioned that any damping material used to compress the information storage discs, whether it be formed as a continuous ring or as a discontinuous section of ring, is encompassed by the current invention as long as it is effective at damping the vibrations of a disc so as to reduce the effects of disc flutter. Accordingly, all such modifications, changes and alternatives are encompassed in the spirit of the invention disclosed and as defined in the appended claims.

What is claimed is:

1. A disc drive motor spindle assembly for reducing the effects of disc flutter in a disc drive, the assembly comprising:
    a disc drive motor spindle having a cylindrical hub portion defining an outer surface and a bottom flange having a top side defining a chamfered edge, the bottom flange extending beyond the outer surface of the hub portion;
    an annular information storage disc having a central aperture, a top surface and a bottom surface mounted on the cylindrical hub portion;
    a disc clamp having a tubular sidewall, the tubular sidewall having a bottom side defining a chamfered edge, the disc clamp on the cylindrical hub portion extending radially outward beyond the outer surface of the hub portion onto a portion of the annular information storage disc, wherein the disc clamp is secured to the cylindrical hub portion to clamp the annular information storage disc between the disc clamp and the bottom annular flange; and
    a damping ring spaced a predetermined distance from the outer surface of the cylindrical hub portion contacting the annular information storage disc and one of either the disc clamp or the bottom annular flange for absorbing vibrational energy from the annular information storage disc.

2. The disc drive motor spindle assembly of claim 1, wherein the damping ring is an elastomer.

3. The disc drive motor spindle assembly of claim 1, further comprising:

a second disc mounted on the cylindrical hub portion, the second disc defining a top surface and a bottom surface; and an annular disc spacer having a top surface, a bottom surface and a tubular sidewall attached to the outer surface of the cylindrical hub portion of the disc drive spindle between the second disc and the first aforesaid disc.

4. The disc drive motor spindle assembly of claim 3, further comprising:

second, third and fourth damping rings, wherein the first aforesaid damping ring and second damping ring contact the first disc between the disc clamp and the top surface of the annular disc spacer, and the third and fourth damping rings contact the second disc between the bottom surface of the annular disc spacer and the bottom annular flange.

5. A disc drive motor spindle assembly for reducing the effects of disc flutter in a disc drive, the assembly comprising:

a disc drive motor spindle having a cylindrical hub portion defining an outer surface and a bottom flange that extends beyond the outer surface of the hub portion;

an annular information storage disc having a central aperture, a top surface and a bottom surface mounted on the cylindrical hub portion;

a disc clamp on the cylindrical hub portion extending radially outward beyond the outer surface of the hub portion onto a portion of the annular information storage disc, wherein the disc clamp is secured to the cylindrical hub portion to clamp the annular information storage disc between the disc clamp and the bottom annular flange; and a first and second damping rings, the two damping rings contacting the annular information storage disc between the disc clamp and the bottom annular flange, wherein the first damping ring contacts the top surface of the disc at a first predetermined distance from the outer surface of the cylindrical hub portion and the second damping ring contacts the bottom surface of the disc at a second predetermined distance from the outer surface of the cylindrical hub portion.

6. The disc drive motor spindle assembly of claim 5, wherein the first and second predetermined distances are the same.

7. The disc drive motor spindle assembly of claim 6, wherein the disc clamp and the bottom annular flange of the cylindrical hub portion each define a peripheral groove for supporting one of the two damping rings.

8. The disc drive motor spindle assembly of claim 6, wherein: the disc clamp has a tubular sidewall and one of the damping rings is overmolded to the disc clamp tubular sidewall; and the bottom annular flange of the cylindrical hub portion has a tubular sidewall and one of the damping rings is overmolded to the bottom annular flange sidewall.

9. The disc drive motor spindle assembly of claim 8, wherein: the disc clamp tubular sidewall has a bottom side defining a chamfered edge; and the bottom annular flange sidewall has a top side defining a chamfered edge.

10. A disc drive motor spindle assembly for reducing the effects of disc flutter in a disc drive, the assembly comprising:

a disc drive motor spindle having a cylindrical hub portion defining an outer surface and a bottom flange that extends beyond the outer surface of the hub portion;

a first and second annular information storage disc, each having a central aperture, a top surface and a bottom surface and each mounted on the cylindrical hub portion;

an annular disc spacer having a top surface, a bottom surface and a tubular sidewall attached to the outer surface of the cylindrical hub portion on the disc drive spindle between the first information storage disc and second information storage disc;

a disc clamp on the cylindrical hub portion extending radially outward beyond the outer surface of the hub portion onto a portion of the annular information storage disc, wherein the disc clamp is secured to the cylindrical hub portion to clamp the annular information storage disc between the disc clamp and the bottom annular flange; and first, second and third damping rings wherein the first damping ring contacts the top surface of the first disc at a first predetermined distance from the outer surface of the cylindrical hub portion, the second damping ring is overmolded to the tubular sidewall of the annular disc spacer and contacts the bottom surface of the first disc and the top surface of the second disc at a second predetermined distance from the outer surface of the cylindrical hub portion, and the third damping ring contacts the bottom surface of the second disc at a third predetermined distance from the outer surface of the cylindrical hub portion.

11. The disc drive motor spindle assembly of claim 10, wherein the first, second and third predetermined distances are the same.

12. A disc drive motor spindle assembly for reducing the effects of disc flutter in a disc drive, the assembly comprising:

a disc drive motor spindle having a cylindrical hub portion defining an outer surface and a bottom flange that extends beyond the outer surface of the hub portion;

a first and second annular information storage disc, each having a central aperture, a top surface and a bottom surface and each mounted on the cylindrical hub portion;

an annular disc spacer having a top surface, a bottom surface and a tubular sidewall attached to the outer surface of the cylindrical hub portion on the disc drive spindle between the first information storage disc and second information storage disc;

a disc clamp on the cylindrical hub portion extending radially outward beyond the outer surface of the hub portion onto a portion of the annular information storage disc, wherein the disc clamp is secured to the cylindrical hub portion to clamp the annular information storage disc between the disc clamp and the bottom annular flange; and first, second, third and fourth damping rings, the first damping ring contacting the top surface of the first disc at a first predetermined distance from the outer surface of the cylindrical hub portion, the second damping ring contacting the bottom surface of the first disc at a second predetermined distance from the outer surface of the cylindrical hub portion, the third damping ring contacting the top surface of the second disc at a third predetermined distance from the outer surface of the cylindrical hub portion, and the fourth damping ring contacting the bottom surface of the second disc at a fourth predetermined distance from the outer surface of the cylindrical hub portion.

13. The disc drive motor spindle assembly of claim 12, wherein the first, second, third and fourth predetermined distances are the same.

14. The disc drive motor spindle assembly of claim 13, wherein the disc clamp, the top surface of the annular disc spacer, the bottom surface of the annular disc spacer and the bottom annular flange of the cylindrical hub portion each define a peripheral groove for supporting one of the four damping rings.

15. The disc drive motor spindle assembly of claim 13, wherein the annular disc spacer defines a top notch positioned in the top surface of the annular disc spacer and a bottom notch positioned in the bottom surface of the annular disc spacer, each notch defining a tubular sidewall, and one of the damping rings overmolded to each sidewall.

16. The disc drive motor spindle assembly of claim 15, wherein the tubular sidewall in each of the top and bottom notch of the annular disc spacer defines a chamfered edge.

17. A method of reducing the effects of disc flutter in a disc drive, the method comprising steps of:
 (a). providing a disc drive motor spindle having a cylindrical hub portion;
 (b). placing an annular disc on the hub portion of the disc drive motor spindle;
 (c). engaging the annular disc with a damping ring at a distance from the hub portion of the disc drive motor spindle; and
 (d). securing a disc clamp to the hub portion of the disc drive motor spindle for exerting a clamping force to the annular disc.

18. The method according to claim 17 wherein hub portion has a bottom annular flange and engaging step (c) further comprises the steps of:
 (c)(i). positioning the damping ring between the annular disc and one of the bottom annular flange and disc clamp; and
 (c)(ii). securing the annular disc between a bottom annular flange of the hub portion and the disc clamp.

19. The method according to claim 17, wherein the placing step further comprises the steps of:
 (b)(i). positioning an annular disc spacer on the disc drive motor spindle hub portion;
 (b)(ii). assembling a second annular disc on the disc drive motor spindle hub portion such that the spacer is between the first annular disc and the second annular disc; and
 (b)(iii). engaging the second annular disc with a second damping ring at a distance from the hub portion of the disc drive spindle.

20. A disc drive motor spindle assembly for reducing the effects of disc flutter in a disc drive, the spindle assembly comprising:
 a disc drive motor spindle having a cylindrical hub portion defining an outer surface and a bottom flange having a top side defining a chamfered edge, the bottom flange extending beyond the outer surface of the hub portion;
 an annular information storage disc having a central aperture, a top surface and a bottom surface mounted on the cylindrical hub portion;
 a disc clamp having a tubular sidewall, the tubular sidewall having a bottom side defining a chamfered edge, the disc clamp on the cylindrical hub portion extending radially outward beyond the outer surface of the hub portion onto a portion of the annular information storage disc, wherein the disc clamp is secured to the cylindrical hub portion to clamp the annular information storage disc between the disc clamp and the bottom annular flange; and
 means spaced a predetermined distance from the hub portion and contacting the information storage disc and one of either the disc clamp or the bottom annular flange for damping vibrations of the annular disc.

* * * * *